Figures 1, 2, 4:
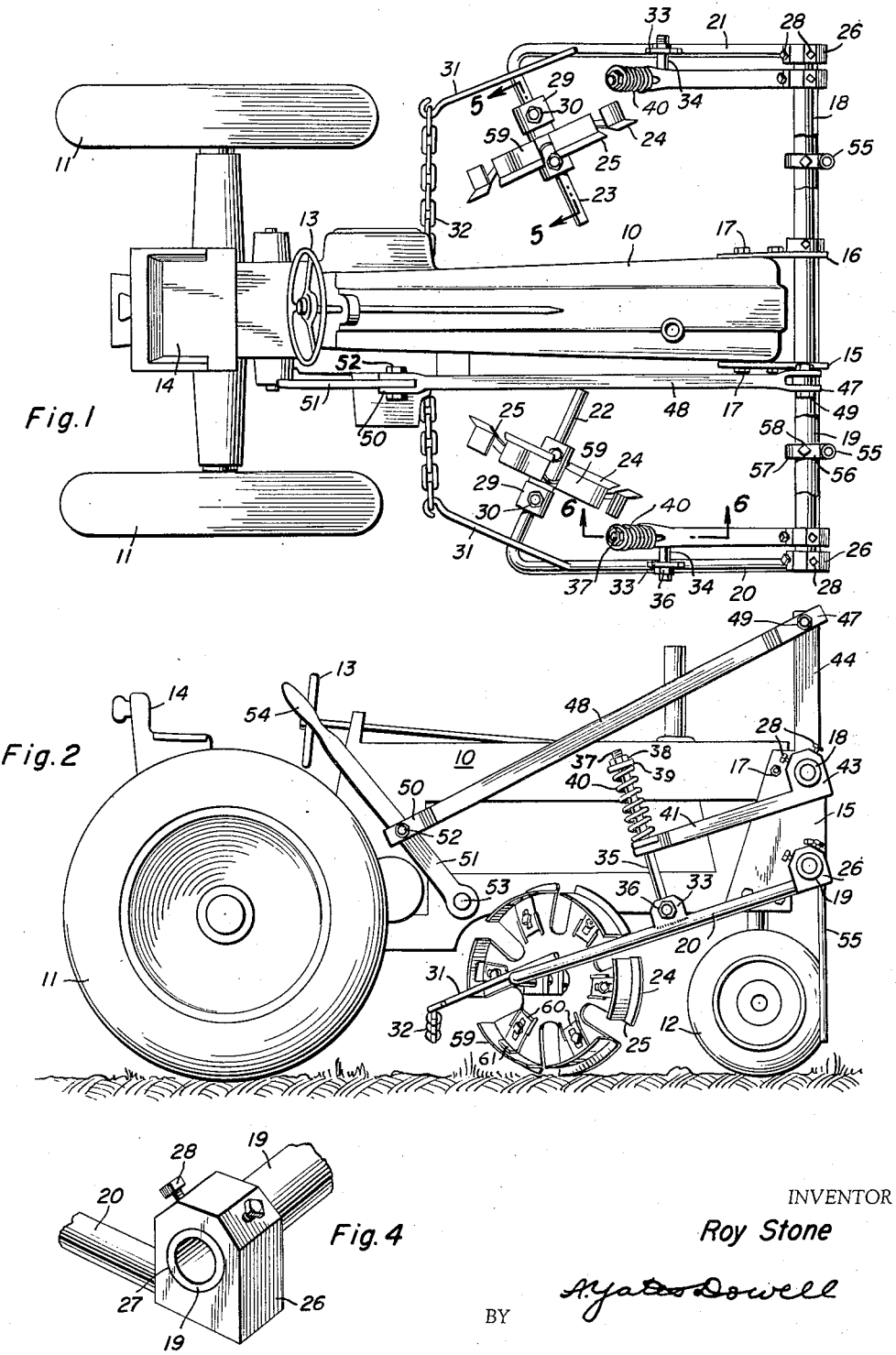

Nov. 15, 1960

R. STONE 2,960,173

COTTON CHOPPER ATTACHMENT

Filed April 13, 1955

2 Sheets-Sheet 1

INVENTOR
Roy Stone

BY

ATTORNEY

Nov. 15, 1960  R. STONE  2,960,173
COTTON CHOPPER ATTACHMENT
Filed April 13, 1955  2 Sheets-Sheet 2
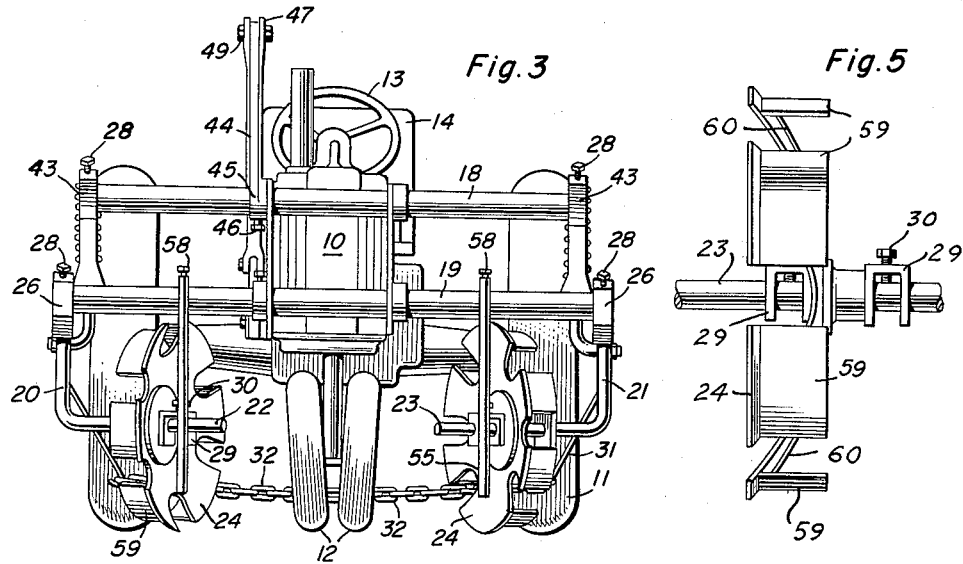
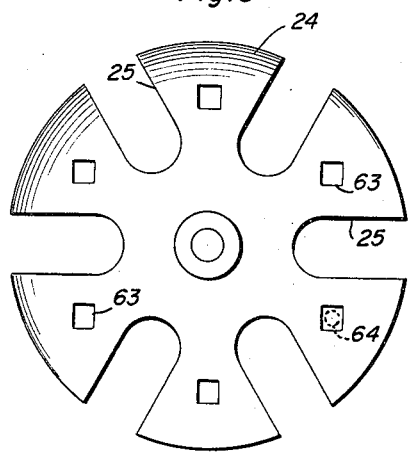
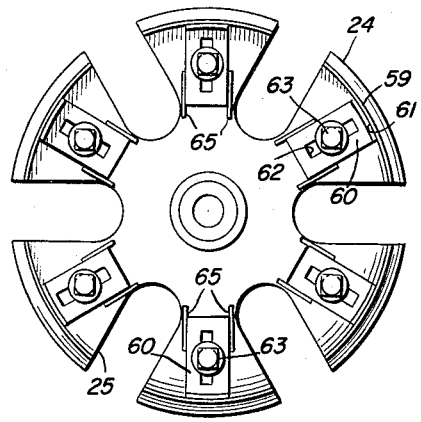
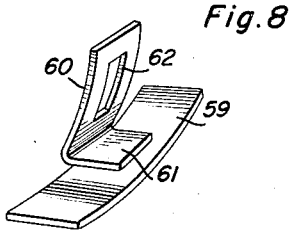
INVENTOR
Roy Stone
BY
ATTORNEY

United States Patent Office 2,960,173
Patented Nov. 15, 1960

2,960,173

COTTON CHOPPER ATTACHMENT

Roy Stone, Warrenton, Ga.

Filed Apr. 13, 1955, Ser. No. 501,032

6 Claims. (Cl. 172—534)

This invention relates to the care and cultivation of plants of various kinds and especially to plants cultivated in substantial acreage, such as for example, cotton or the like, and more particularly to equipment employed in such cultivation.

The invention is concerned especially with equipment which can move along rows of cotton or other plants and operate upon the soil and plants growing therein, thereby to promote the growth and maturity of the plants and the harvesting of the fruit thereof.

Machines for this purpose have not been satisfactory for various reasons including the difficulty encountered in undertaking to adjust and use the same, and they would not operate satisfactorily, and when coming in contact with a rock or other obstruction they would be damaged.

It is an object of the invention to provide an inexpensive chopper attachment for use with cotton or other plants and capable of being easily applied to or removed from a conventional tractor or other vehicle, self-propelled or otherwise and by means of which two or more rows can be operated upon simultaneously, as well as a chopper having means for lowering it to operating position and for raising it to inoperative position, and at the same time having means for supporting the device resiliently.

A further object of the invention is to provide for a conventional vehicle a chopper attachment which includes a disk having adjustable depth-determining rim structure capable of being easily varied to cause chopping of the desired depth.

Other objects and advantages of the invention will be apparent from the following description taken in conjunction with the accompanying drawings wherein:

Fig. 1 is a top plan view illustrating one application of the invention as applied to a conventional tractor;

Fig. 2, a side elevation thereof;

Fig. 3, a front elevation;

Fig. 4, a fragmentary detail perspective;

Fig. 5, a front elevation of one of the choppers;

Fig. 6, a side elevation of one of the choppers;

Fig. 7, a side elevation taken from the opposite side of one of the choppers illustrating the adjustable depth determining rim structure; and, Fig. 8, a perspective of one of the depth adjusting members.

Briefly stated, the present invention is a cotton chopper attachment for a tractor or other vehicle, two or more of which choppers may be employed for operating upon a corresponding number of rows of cotton or other plants, such choppers being set at an angle to the direction of movement of the vehicle and having a series of radial plant slots so that plants may pass therethrough and be allowed to stand at such location. Each chopper is provided with adjustable depth determining rim sections located along the circumference of the disk between the slots and, except for the slots, forming a continuous rim. The choppers are resiliently supported so that when they come into contact with a rock or other obstruction they may yield and not be damaged. The attachment for the tractor or other vehicle includes bracket means mounting a transverse bar with rearwardly extending lever arms pivoted thereon having angularly disposed end portions on which the choppers are mounted, and with resilient supporting means for maintaining such lever arms and the supported choppers at the desired elevation but serving to absorb the shock of the choppers during movement of the vehicle regardless of the elevation of the choppers.

With continued reference to the drawings a self-propelled tractor 10 having rear driving wheels 11, outer pivoted front wheels 12, a steering wheel 13 and a seat 14 is adapted to have the invention applied thereto.

In order to mount the chopper mechanism on the tractor 10 or other vehicle a pair of supporting brackets or plates 15 and 16 are attached by bolts 17 to the front of the tractor 10 and in these plates 15 and 16 are mounted upper and lower shafts 18 and 19 of a length corresponding substantially to the maximum width of the vehicle, the lower shaft 19 being slightly longer than the upper shaft 18.

On the outer ends of the lower shaft 19 are fixed chopper disk lever arms 20 and 21 having angularly disposed portions 22 and 23 forming V-shaped levers with one leg adjustably mounted on shaft 19 and on the other leg of which are rotatably mounted concavo-convex disks 24 having radial slots 25 through which plants are adapted to pass as the tractor travels along the rows of cotton or other plants and with the disks rotating at the same time.

The lever arms 20 and 21 are mounted by means of blocks 26 on the lower shaft 19, such blocks having openings 27 in which the ends of the shaft 19 are received and being held therein by means of one or more set screws 28 as shown particularly in Fig. 4. Rotation of the shaft 19 will produce swinging of the arms 20 and 21 about the axis of the shaft to raise and lower the chopper disks 24, such disks being confined on the angularly disposed portions 22 and 23 of the lever arms 20 and 21 by means of adjustable collars 29 held in place by set screws 30. In order to limit the upward swinging of the lever arms 20 and 21 and to prevent their separation during operation of the choppers, forwardly disposed hooks 31 are mounted across the angle between the lever arms 20 and 21 and the angular portions 22 and 23 thereof and these hooks are connected by cross chain 32 so that the chain 32 engages the tractor on the upward swinging of the arms.

From the structure described it will be understood that the chopper disks 24 may remain in contact with the ground when a vehicle is moving and in order to support such chopper disks yieldably so that they will not enter the ground too deeply the lever arms 20 and 21 are provided with perforated ears 33 in which the lateral extremities 34 (Fig. 1) of L-shaped members 35 are secured by means of nuts 36. The upper ends of the L-shaped members 35 are provided with threads 37 on which are engaged retaining nuts 38 in contact with washers 39 between which and a similar washer, a spring 40 is confined, the lower washer resting on the bifurcated end of a lever arm 41, lever arm 41 connected by a block 43 to the upper shaft 18 and fixed to such shaft by one or more set screws 28. Slight rotation of the shaft 18 in one direction will cause pressure to be exerted upon the springs 40 tending to resiliently lift the arms 20 and 21 and the chopper disks 24.

In order to rotate the shaft 18 in the brackets 15 and 16 suitable linkage including an upright arm 44 having a sleeve 45 (Fig. 3) in which the shaft 18 is received and is fixed thereto by set screw 46. The upper end of the upright arm 44 is received within the bifurcated end 47 of a link 48 and is connected to such bifurcated end by means of a bolt 49. Reciprocation of the link 48 will tend to swing the upright arm 44 to rotate the shaft 18. In order to produce reciprocation of the link 48 it is provided with a bifurcated end 50 in which is received a hand lever 51, the hand lever and the bifurcated end 50 being connected by bolt 52, the hand lever being mounted on pivot 53 attached to the frame of the vehicle and the opposite end of the hand lever is provided with a hand grip 54. When the parts are in the position shown in Figs. 1, 2 and 3 the chopper disks will be in position to rotate as the vehicle travels along rows of cotton or other plants to cause contact with the earth to produce a cutting and earth-moving action angularly across the rows. The depth the chopper disks enter the earth will be controlled as hereinafter described. The hand lever may be operated for elevating the chopper disks to a position where they do not engage the earth.

In order to remove rocks and other obstructions ahead of the chopper disks depending rods or bars 55 may be provided one in front of each chopper disk and being adjustably fixed to the shaft 19 by a block 56 having opening 57 in which the shaft 19 is snugly received and being fixed to the shaft by means of a set screw 58. Bars 55 also serve as sight means for use by the operator in guiding the tractor.

From the foregoing it will be apparent that a chopper is provided having rotary chopper disks each adapted to come into contact with the earth of the row in which the plant is growing and at an angle to the direction of movement of the vehicle, the disks providing a chopping action across the row while the radial slots allow plants to pass therethrough with the surrounding earth moved by the non-slotted portions of the chopper disks across the row as in manual chopping with a hoe. In view of the fact that the disks are resiliently mounted they can follow the contour of the earth and yield when an obstruction is encountered. Raising and lowering of the disks from operative to inoperative position is operator-controlled.

In order to provide a depth gauge or control the penetration of the chopper disks midway between adjacent radial kerfs or slots 25 are provided a series of rim sections 59 curved similar to the curvature of the outer edge of the chopper disks, the number of such rim sections corresponding to the number of spaces between the plant slots 25. Rim sections 59 are mounted on supporting brackets 60 having lateral extremities 61 welded or otherwise secured to the rim sections although if desired rim sections and supporting brackets can be of integral construction, such brackets having a longitudinal curvature corresponding to the radial curvature of chopper disks so that it will fit snugly against the same and in order to adjustably mount the bracket 60 it is provided with a slot 62 for the reception of a bolt 63 located in an opening 64 in the chopper disks. In order to prevent the bracket 60 from rotating spaced pairs of outwardly extending flanges 65 are provided on the convex side of the chopper disks midway between the six plant slots, each of the pair of parallel flanges being equally spaced at opposite sides of a radius disposed midway between the adjacent plant slots, such flanges being spaced according to the width of the brackets so that the brackets may be adjusted radially and secured in such adjusted position.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A cotton chopper attachment comprising bracket means for attachment to a tractor, a shaft supported by said bracket means and adapted to be disposed transversely of the tractor, pivoted lever arms attached to said transverse shaft and having angular extremities extending inwardly toward each other, a slotted chopper disk adjustably mounted on each of said angular extremities and swingable with said lever arms, adjustable depth determining means on said chopper disks, a second pivoted shaft transversely overlying said first shaft and carrying a pair of parallel spaced arms overlying said pivoted lever arms, resilient means connecting said pivoted lever arms with said spaced arms for resiliently supporting said lever arms so that the chopper disks may yield upon encountering a stone or other obstruction, lever and linkage mechanism for rotating said second shaft to raise or lower said chopper disks, transversely disposed means extending between the free ends of said lever arms for limiting separation and the upward swing of said lever arms, and depending members for alignment of said chopper disks relative to the rows and for removing obstructions ahead of said choppers.

2. A cotton chopper attachment comprising bracket means for attachment to a tractor, a shaft supported by said bracket means and adapted to be disposed transversely of the tractor, pivoted lever arms attached to said transverse shaft and having angular extremities, a chopper disk having plant slots therein adjustably mounted on each of said angular extremities and swingable with said lever arms, adjustable depth determining means on said chopper disks comprising arcuate rim portions and depending longitudinally slotted brackets extending from said rim portions, spaced parallel flanges on the convex sides of said chopper disks and between the slots of said disks with said brackets located in radial position between said parallel flanges for endwise movement, means for resiliently supporting said lever arms so that the chopper disks may yield upon encountering a stone or other obstruction, lever and linkage mechanism for rotating said lever arms to raise said chopper disks from operative position, elongated transversely disposed means extending between and secured to the outer ends of said lever arms for limiting separation and the upward swing of said lever arms, and depending members for alignment of said chopper disks relative to the rows and for removing obstructions ahead of said choppers.

3. A cotton chopper attachment for a tractor for mounting on the front of a tractor to permit effective observation of the operation thereof by the driver of a tractor comprising a pair of brackets disposed in spaced relation for securement to the sides of a tractor adjacent the front end thereof, a first shaft rotatably mounted in said brackets adjacent the lower portion thereof and projecting outwardly beyond said brackets, a pair of V-shaped levers, each V-shaped lever adjustably secured by one of its legs to one end of said first shaft with the other leg of each V-shaped lever extending toward the other end of said first shaft, a cotton chopper disk rotatably mounted on each of said other legs of said V-shaped levers, means to adjustably mount said chopper disks to provide for variations in spacing between rows of vegetation to be cultivated, extensions on said V-shaped levers, a flexible member extending between said extensions and fixed thereto to prevent lateral separation of said V-shaped levers and for engaging the bottom of the tractor to limit the upward movement of said V-shaped levers and said chopper disks, a second shaft positioned above said first shaft and rotatably mounted in said pair of brackets, an arm projecting from each end of said second shaft, a link pivotally mounted on said one leg of each V-shaped lever and slidably received in the free end of the associated arm, a spring reacting between said link and said arm for controlling the downward force on said chopper disk, and means to positively rotate said second shaft for controlling the effective downward force on said chopper disks.

4. A cotton chopper attachment for a tractor for mounting on the front of a tractor to permit effective observation of operation thereof by the driver of a tractor comprising a pair of brackets for mounting in spaced relation and for securement to the sides of a tractor adjacent the front end thereof, a first shaft rotatably mounted in said brackets adjacent the lower portion thereof and projecting outwardly beyond said brackets, a pair of V-shaped levers, each V-shaped lever adjustably secured by one of its legs to one outer end of said first shaft with the other leg of each of said levers extending toward the other end of said first shaft, a cotton chopper disk rotatably mounted on each of said other legs of said V-shaped levers, means on each chopper disk to limit the penetration of the disk into the earth, means to adjustably mount said chopper disks on said V-shaped levers to provide for variations in spacing between rows of vegetation to be cultivated, a flexible member extending between said V-shaped levers and fixed thereto to prevent lateral separation of said V-shaped levers and for engaging the bottom of the tractor to limit the upward movement of said V-shaped levers, a second shaft positioned above said first shaft and rotatably mounted in said pair of brackets, an arm projecting from each end of said second shaft, a link pivotally mounted on said one leg of each V-shaped lever and slidably received in the free end of the associated arm, a spring reacting between said link and said arm for controlling the downward force on said chopper disk, and means to positively rotate said second shaft for controlling the effective downward force on said chopper disks.

5. Cotton chopping equipment comprising a tractor, a pair of plates mounted in substantially parallel relation on opposite sides of the front of the tractor, a horizontally positioned transversely disposed upper shaft rotatably mounted in said plates, an upright arm projecting upwardly from and fixed to said shaft, a link extending rearwardly from the upper end of said arm, a hand lever pivoted to the tractor and operatively connected to the rear end of said link for causing rotation of said upper shaft, a lower horizontally positioned transversely disposed shaft rotatably mounted on said plates directly below said upper shaft and parallel therewith, a chopper disk lever arm fixed to each end of said lower shaft and extending rearwardly only, the rear end of each chopper disk lever being bent at an acute angle forwardly and lying in substantially the same plane as the other chopper disk lever arm, a cotton chopper disk rotatably mounted on the bent end of each lever arm for rotation in planes diverging forwardly, each chopper disk having notches in the periphery thereof, individually adjustable depth limiting gauges mounted on each chopper disk between said notches for radial adjustment to control the depth of penetration of said chopper disk into the earth, an obstruction removing rod mounted on said lower shaft in alignment with each chopper disk and extending downwardly to adjacent the ground, an extension projecting rearwardly from each chopper disk lever arm and extending across the lever arm and bent end of the associated lever arm and fixed thereto to project rearwardly beyond the periphery of the associated chopper disk and lying in the plane of said lever arms, a flexible substantially non-yieldable tension member extending between said rear extremities of said extensions to limit outward movement of said lever arms thereby avoiding undesirable bending forces on said arms, and a lifting lever arm extending rearwardly from each end of said upper shaft and yieldably connected to the associated chopper disk lever arm to maintain said chopper disks at a desired elevation, said chopper disks being of concave convex configuration with the concave surface of one disk facing the concave surface of the other disk, the convex surface of the disks having a plurality of pairs of outwardly extending flanges between adjacent notches, said disks being provided with a bolt receiving aperture between the flanges of each pair, said depth limiting gauge including a plurality of arcuate rim sections each having a slotted supporting bracket received between the flanges of each pair and retained in adjusted position by a bolt.

6. Agricultural equipment comprising horizontally disposed pivotal mounting means, a pair of elongated levers, each of said levers being pivotally mounted at one end to said pivot means and extending rearwardly therefrom, each of said levers being arranged in generally spaced parallel relation to one another and having laterally inturned members forwardly converging toward one another from a location intermediate the length of said levers, ground working elements mounted upon each of said inturned members at similar angles relative to the pivotal mounting means and in a manner producing intermediate the length of said levers laterally outward thrust against said levers when the ground working elements are engaging the ground, tension means extending laterally between said levers and connecting the ends of said levers remote from said pivoted ends together for restraining the lateral outward thrust produced by the ground working elements.

References Cited in the file of this patent

UNITED STATES PATENTS

| | | |
|---|---|---|
| 63,134 | Batchelder | Mar. 26, 1867 |
| 409,718 | Vibert | Aug. 27, 1889 |
| 1,363,458 | Copeland | Dec. 28, 1920 |
| 1,785,676 | De Yone | Dec. 16, 1930 |
| 1,932,112 | Lindgren | Oct. 24, 1933 |
| 2,050,424 | Davis | Aug. 11, 1936 |
| 2,137,233 | Brotzman | Nov. 22, 1938 |
| 2,259,874 | Benjamin | Oct. 21, 1941 |
| 2,274,769 | Zink et al. | Mar. 3, 1942 |
| 2,319,899 | Silver | May 25, 1943 |
| 2,505,560 | Mayberry et al. | Apr. 25, 1950 |
| 2,689,511 | Begeman et al. | Sept. 21, 1954 |
| 2,705,445 | Giordano | Apr. 5, 1955 |